US00RE35493E

United States Patent [19]

Horton

[11] E Patent Number: Re. 35,493

[45] Reissued Date of Patent: Apr. 15, 1997

[54] ROLLER BRAKE

[75] Inventor: H. Burke Horton, Malvern, Pa.

[73] Assignee: Thistle Sports Enterprises, Inc., West Chester, Pa.

[21] Appl. No.: 433,143

[22] Filed: May 3, 1995

Related U.S. Patent Documents

Reissue of:

[64] Patent No.: 5,280,931
Issued: Jan. 25, 1994
Appl. No.: 979,603
Filed: Nov. 20, 1992

[51] Int. Cl.[6] ..... A63C 17/14

[52] U.S. Cl. ..... 280/11.2; 280/11.22; 188/5

[58] Field of Search ..... 280/11.19, 33.994, 280/11.2, 11.22, 11.23, 87.041, 87.042; 188/5, 25, 27.1, 1.12, 26, 27, 83, 70 R, 4 B

[56] References Cited

U.S. PATENT DOCUMENTS

| | | | |
|---|---|---|---|
| 28,509 | 5/1860 | Shaler . | |
| 182,835 | 10/1876 | Lockwood . | |
| 334,739 | 1/1886 | Blun | 280/11.2 |
| 503,233 | 8/1893 | Frankenberg . | |
| 916,289 | 3/1909 | Fitzgerald . | |
| 1,371,623 | 2/1921 | Ickenroth . | |
| 1,616,952 | 2/1927 | Dahl . | |
| 1,801,205 | 4/1931 | Mirick . | |
| 2,021,316 | 11/1935 | Marx | 280/173 |
| 2,191,018 | 2/1940 | Ickenroth | 280/11.2 |
| 2,644,692 | 7/1953 | Kahlert | 280/11.2 |
| 3,224,785 | 12/1965 | Stevenson | 280/11.2 |
| 3,287,023 | 11/1966 | Ware | 280/11.2 |
| 3,339,936 | 9/1967 | Hamlin | 280/11.2 |
| 3,387,852 | 6/1968 | De Sarro | 280/11.2 |
| 3,823,952 | 7/1974 | Kukulowicz | 280/11.2 |
| 3,880,441 | 4/1975 | Silver | 280/11.2 |
| 3,900,203 | 8/1975 | Kukulowicz | 280/11.2 |
| 4,181,227 | 1/1980 | Balstad | 280/11.2 |
| 4,273,345 | 6/1981 | Ben-Dor et al. | 280/11.2 |
| 4,898,403 | 2/1990 | Johnson | 280/11.2 |
| 5,028,058 | 7/1991 | Olson | 280/11.2 |
| 5,048,848 | 9/1991 | Olson et al. | 280/11.22 |
| 5,052,701 | 10/1991 | Olson | 280/11.2 |
| 5,138,275 | 2/1993 | Hoskin | 188/25 |
| 5,308,093 | 5/1994 | Walin | 280/11.2 |

*Primary Examiner*—Richard M. Camby
*Attorney, Agent, or Firm*—Eckert Seamans Cherin & Mellott

[57] ABSTRACT

A roller brake for a roller vehicle such as an in-line roller skate is mounted at an end of a substantially horizontal platform. The roller brake includes a non-rotatable brake hub connected to the chassis, the hub having a horizontal axis perpendicular to a direction of forward travel. The brake hub has a circumferential periphery defining a V-shaped groove, for receiving a brake tire rotatably mounted annularly on the brake hub. The outer periphery of the brake tire is normally disposed above the ground surface but is selectively engageable with the ground surface, preferably simply by tilting the horizontal platform on an endmost ground-engaging wheel adjacent the roller brake. Contact with the ground surface engages the tire with the ground and produces rotation of the tire on the brake hub. Kinetic energy of motion is dissipated as frictional heating between the rotating brake tire and the fixed brake hub. The V-shaped groove is 120° to 150° and the tire is thermoset polyurethane and oversized relative to the hub by 0.5 to 1.3 mm, whereby the tire is not readily stopped on the hub (caused to skid on the ground). The roller brake produces friction in a predictable manner which does not vary as a function of the smoothness of the ground surface.

21 Claims, 2 Drawing Sheets

ROLLER BRAKE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a brake mechanism comprising a rotatable annular element mounted on a non-rotatable hub along facing surfaces shaped to increase friction when the annular element is pressed toward a support surface, thereby imparting steady and controllable braking force. The invention is particularly applicable to slowing small moving platforms such as roller skates, skate boards, scooters and similar vehicles which can be tilted to apply the brake to a bearing surface. The brake mechanism also can be arranged on a vertically movable mount for applying the brake, making it applicable to heavier vehicles such as service carts or even large vehicles such as trucks. In addition to providing dynamic braking, the invention is advantageous for rendering supporting platforms immovable when loaded, and movable when unloaded, due to the difference in frictional engagement of the annular element and the hub caused by the change in loading weight.

2. Prior Art

Various forms of wheeled devices that permit a person to traverse a ground surface are known. One class of such devices includes roller skates, skateboards, scooters and similar small vehicles, which have a relatively small platform supported by wheels. The platform can be manipulated by the user in operating the device. Braking stops are often included in vehicles of this type, typically comprising a rubber block or ball that protrudes downwardly at the front or rear of the device at an elevation higher than the lower periphery of the wheels, but which can be pressed against the floor, pavement or other ground surface over which the device moves. Friction between the stop and the ground surface helps to slow the device.

The stop is normally caused to press against the ground surface by tilting the platform around an axis transverse to the direction of motion, until the elevation of the stop is equal to that of the wheels, i.e., bringing the stop into engagement with the ground. By varying the extent of tilting, the user varies the proportion of his or her weight which is borne by the stop, as opposed to being borne by the wheels, and thus varies the frictional force exerted for stopping.

Figure skates (both ice skates and roller skates) generally have a stop at the front or toe end, whereby the user can push off from the toe or fix the toe in position in order to execute a turn or spin. It is also known to place a stop in at the rear, by which the user simply exerts friction in order to slow down or stop. U.S. Pat. No. 2,191,018—Ickenroth, for example, discloses a four wheel roller skate having a soft rubber stop which is pivotally attached to extend rearwardly behind the rear wheel of the skate, at a slightly higher elevation than the wheel. A skater tilts the skate (i.e., raises the toe of the skate higher than the heel) to engage the stop with the skating surface. Braking action is produced by abrasion of the stop on the skating surface. Another example of a rear stop is disclosed in U.S. Pat. No. 2,021,316—Marx, wherein a stop similar to a wheel disposed perpendicular to the direction of movement protrudes to the rear and can be engaged against the ground by tilting the skate. In U.S. Pat. No. 4,181,227—Balstad, a cylindrical toe mounted stop is provided. The stop is fixed against rotation by a through-bolt arranged to enable the position of the stop to be varied as desired.

U.S. Pat. Nos. 5,028,058 and 5,052,701, both to Olson, similarly disclose roller skates having a rear mounted stops. In this case the skates are in-line roller skates having two or more wheels mounted one behind the other, the front and rear wheels being mounted slightly higher than the intermediate wheels so as to define a curve similar to an ice skate blade. The wheels are mounted on a channel-like frame extending along the longitudinal axis of the skate, the wheels being mounted via individual axle pins extending through the channel. In-line skates of this type are popular for outdoor use, typically on concrete or asphalt pavement and the like.

A further possibility is to place a stop at both the front and rear. The front stop permits the user to fix the toe, and the rear stop allows braking while in motion by abrading the rear stop against the skating surface. An example of dual stops is shown in U.S. Pat. No. 4,273,345—Ben-Dor.

Abradable stop devices depend for their stopping ability on the extent of frictional engagement with the skating surface. Of course the skating surface may vary from smooth to irregular and could include any of a multitude of materials having different coefficients of friction. Even on a given stretch of pavement, the user may encounter relatively smoother or rougher sections, affecting the extent to which the abradable stop grabs to the pavement. The skating surface may have a light coating of dirt, gravel or sand which reduces braking action by providing a buffer between the stop and the surface, and provide unpredictable braking results. For very different types of surfaces, e.g., a wood floor vs. an asphalt pavement, the abrading stop will produce quite different braking characteristics.

Abrading stops also have the drawback that as the stop is worn away through abrasion over time, the working surface of the stop becomes higher above the skating surface. The skater will be required to raise the toe of the skate higher in order to engage the stop with the skating surface or to achieve the same force. Therefore, the skater must have the ability to raise the toe of the skate through a range of angles, and cannot become accustomed to a single toe angle for achieving a particular stop engagement. At some point, the stop must be replaced.

U.S. Pat. No. 3,224,785 to Stevenson discloses a form of roller skate supported substantially by a single wheel. A brake arrangement comprises a brake roller mounted on a crank arm and normally disposed above the skating surface and at a space behind the main wheel. When the skate is tilted such that the brake roller engages with the skating surface, the crank arm pivots to move the brake roller into engagement with the main wheel of the skate. Due to contact with the skating surface, both the brake roller and the main wheel seek to rotate in the same direction. However they are forced into contact. Braking action is achieved by either or both of the frictional contact between a surface of the brake roller and a surface of the main wheel, moving in opposite directions, or assuming the brake roller and the main wheel lock, by friction between the brake roller and the skating surface. This skate brake has the drawback that the brake wheel is an abradable element which is subject to wear against both the skating surface and the main wheel. The action also abrades the main wheel. Periodically, the worn elements must be replaced. Further, the braking action is affected by variations in the skating surface as well as by dirt and grit picked up by the brake roller and/or by the main wheel and carried into the nip between them to disrupt smooth application of braking force.

There is a need for a brake mechanism which does not rely either on the bearing surface or on a main bearing wheel of the vehicle, which necessarily picks up dirt from the bearing surface. Such a brake can be protected against dirt and would be unaffected by variable characteristics of the surface. The brake would be particularly useful for applications such as roller skates, skateboards and the like, and also useful for other forms of vehicles. It would be advantageous if such a braking apparatus could be arranged to operate in as convenient a manner as a simple skate brake stop, which is operated by tilting the skate.

The brake according to the invention has friction surfaces which are physically separate from the bearing wheels and the ground engaging portions of the brake. These surfaces thus are protected from dirt and debris. The invention provides a braking roller which does not achieve its primary braking force by abrasion against either the bearing surface or a ground engaging wheel. Instead, the braking roller is designed to engage with the ground surface on an outer surface of the braking wheel, and the frictional contact (i.e., relative motion while in contact) is substantially limited to the engagement between the braking roller and its hub. A particular contour of the friction surface, preferably characterized by opposed conical frustum shapes of the hub and roller, a concave circumferential channel or a convex circumferential shape, allows the user to vary the friction by exerting pressure on the roller in the same manner as with a stop. However, the roller is arranged so as not to slide on the bearing surface and instead to slide substantially exclusively on the hub. Friction is thus provided by the very repeatable interaction of surfaces which are unaffected by dirt or by the character of the surface over which the skate is moving. The friction is thus predictable and constant for a given pressure, with every application of the roller brake.

SUMMARY OF THE INVENTION

It is an object of the invention to provide a brake mechanism for ground traversing vehicles, which is simple, economical and effective for slowing or stopping.

It is another object of the invention to provide a brake that is particularly applicable to small, tiltable platform vehicles such as roller skates, skateboards and the like, which provides predictable braking characteristics notwithstanding variations in the skating surface.

It is a further object of the invention to provide a brake which relies on frictional contact between two known materials, which are isolated from dirt and debris associated with the supporting surface and/or the supporting wheels of the vehicle.

These and other objects are accomplished by a brake mechanism, especially for use with a skate, skateboard, scooter or similar ground engaging vehicle having a chassis to be carried over a supporting surface. The roller brake comprises a brake hub connected to the chassis and defining a horizontal axis perpendicular to a direction of forward travel. The brake hub is fixed against rotation and has a circumferential periphery for holding an annular braking tire intended to engage frictionally with the hub while turning synchronously with the ground surface. The braking tire is rotatably mounted on the brake hub and the outer periphery of the brake wheel is arranged selectively to engage the ground surface. Preferably, the brake hub and braking tire are disposed beyond the last wheel at a rear or front end of the chassis, at an elevation normally above the engagement of the wheels and the bearing surface, whereby the roller brake is selectively engageable with the bearing surface by tilting the chassis to lower the braking tire against the bearing surface, for example wood, concrete, asphalt pavement or the like. Contact of the outer periphery of the braking tire with the surface produces rotation of the braking tire causing the braking tire to idle on the hub, preferably with the periphery of the tire moving at the same speed as the relative passage of the ground surface. The kinetic energy of vehicle motion (including that of the skater or other occupant) is dissipated by friction generated between the rotating brake tire and the fixed brake hub.

The outer periphery of the hub and the inner periphery of the tire are complementary and can be cylindrical, but preferably are shaped to define a V-shaped or U-shaped circumferential channel. In a preferred embodiment the channel defines a V-shaped surface, whereby varying the extent of radial pressure on the tire tends to exert axial inward pressure pinching the tire in the V-shaped surface. The brake hub may include a pair of conical frustum-shaped elements which are faced together at their smaller diameter faces to provide a V-shaped circumferential periphery, or similarly curved to provide a U-shape. The internal diameter of the brake tire is slightly larger than the external diameter of the hub, such that the tire can idle on the hub relatively freely when radial pressure is minimal, and the tire is deformable with pressure. Radial pressure on the brake tire from the ground surface forces the brake the radially into the V-shape to increase friction between the tire and the hub. Upon relaxation of the pressure the brake tire can rotate relatively freely on the hub. The brake hub may be pivotally attached to the chassis to provide a means for adjusting a height of the outer periphery of the brake tire above the skating surface, for example the brake hub being attached to the chassis by a fastener extending through a mounting hole which is eccentric to the axis of the hub and tire. The mounting hole also may be disposed centrally in the brake hub, with no means or other means provided for adjusting height. It is also possible to mount the brake hub for movement relative to the chassis for engaging the bearing surface, e.g., on a controllable crank arm.

By using a metal hub mounted in close contact with a metal supporting frame on the chassis, such as a downwardly opening metal channel, hearing of the hub due to friction is dissipated by the frame. For heavy duty applications of the brake mechanism, supplemental means for dissipating heat can be employed.

Shields or seals may be disposed along the junction of the braking tire and hub, for protecting the chassis against impingement of debris, especially grit picked up by the brake tire from the ground surface. The roller brake is especially suitable for use on a roller skate, skate board, scooter or the like, and is likewise applicable to larger vehicles and to vehicles intended to roll when unloaded and to brake when loaded, such as creepers and rolling stools.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
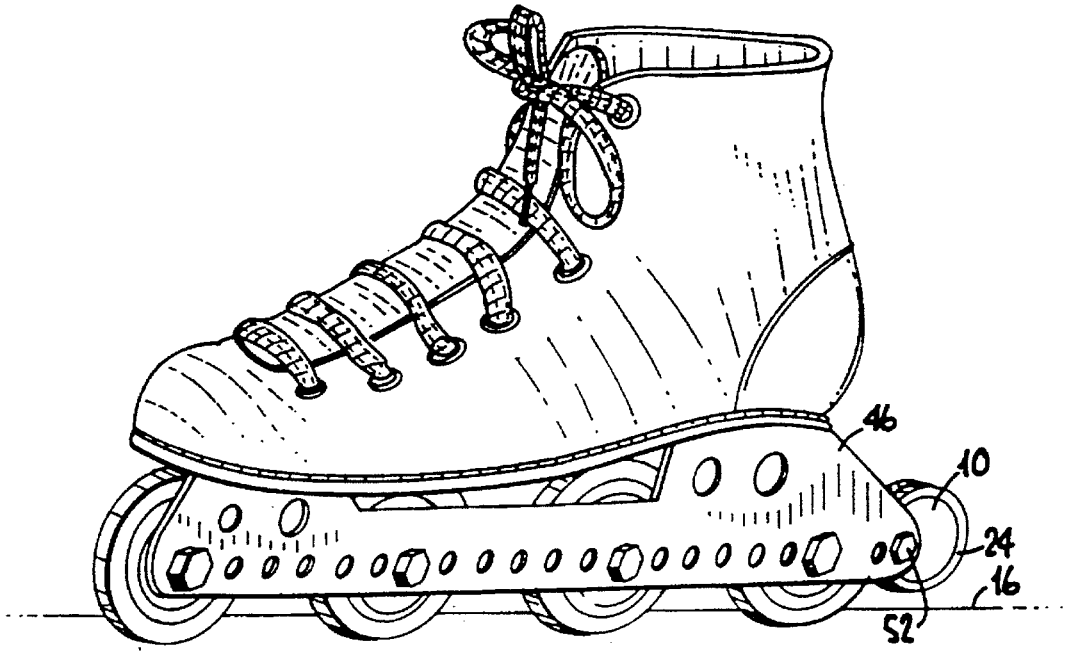
FIG. 1 is a perspective view of a roller skate having a roller brake according to a preferred embodiment of the invention.

A roller brake according to the invention is suitable for use with any device having a chassis and a substantially horizontal platform which travels over a ground surface. As shown in FIG. 1, the roller brake is especially well adapted for use with a roller skate, for example of the in-line wheel variety. The roller brake can also be used with a skate board, scooter or other vehicle which can be manipulated so as to selectively retract the roller brake or apply the roller brake to the ground surface, e.g., by tilting the chassis of the vehicle. Another application is the frictional slowing of larger vehicles, typically using a mechanical means to lower the brake mechanism against the ground for deployment. A further application is the selective braking of wheeled supporting structures such as rolling stools, creepers and the like, intended to roll easily when unloaded, and to remain fixed when loaded, in which case the brake mechanism is used as the main rolling support for the respective structure.

Figure 2:
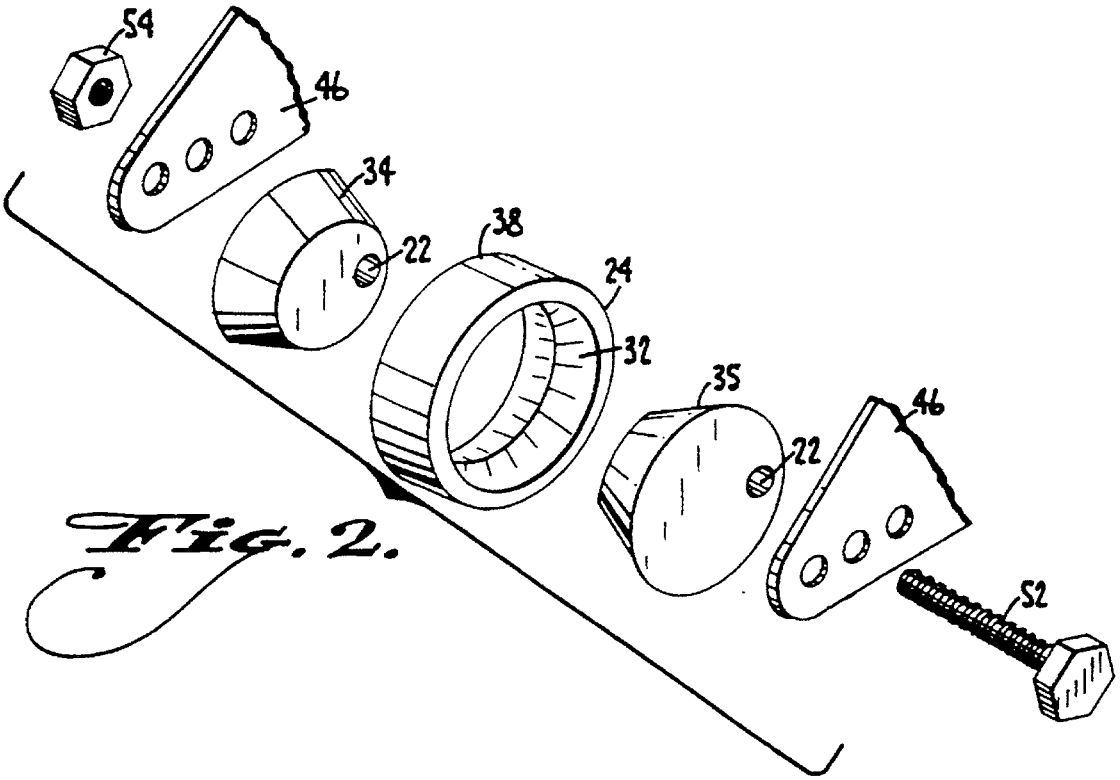
FIG. 2 is an exploded view of the roller brake, showing cutaway sections of the skate frame.
Figure 3:
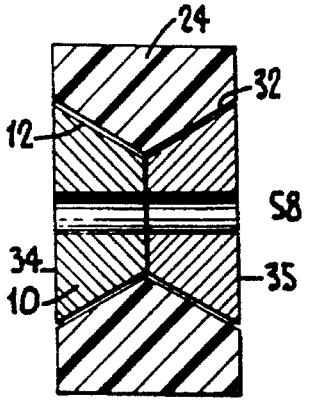
FIG. 3 is a cross-sectional view taken along line 3—3 of FIG. 4.
Figure 5:
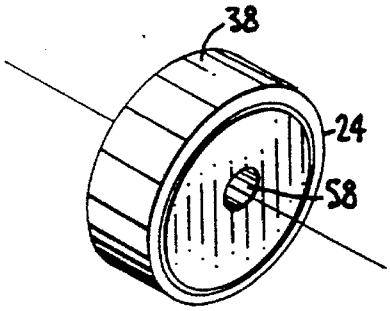
FIG. 5 is a perspective view of a roller brake having a central mounting hole.

As shown in detail in FIGS. 2, 3 and 5 with respect to a skate application, the roller brake includes a brake hub 10 connected to the chassis of the skating device or similar vehicle. The brake hub 10 is generally cylindrical, defining a horizontal axis transverse to a direction of forward travel. The brake hub 10 is fixed against rotation and has a circumferential periphery 12 that is contoured to receive a complementary shaped brake tire 24. The brake tire 24 is mounted annularly on the fixed brake hub 10 and is clearance fit so as to rotate relatively freely on the brake hub when no radial pressure is applied. Rotation of the tire 24 is resisted by frictional engagement between the tire and the hub, which is increased by such radial pressure.

The outer periphery 38 of the brake tire 24 is normally spaced above the ground surface 16, as shown in FIG. 1. In this case the roller brake is mounted at an end of the chassis of the skate, beyond the endmost ground engaging wheel. The roller brake can be mounted in the channel or frame of the skate chassis which also holds the wheels, and/or between the side plates of a mounting accessory. The roller brake is thus selectively engageable with the ground surface by tilting the skate around an axis defined by the endmost ground engaging wheel sufficiently to bring the outer periphery 38 of the brake tire 24 into contact with the ground surface 16. In the embodiment shown in FIG. 1 this angle is about 15°; however the precise angle is a matter of preference and can be adjustable by virtue of the mounting of the roller brake.

The brake tire 24 can be a soft plastic or rubber material. Contact between the outer periphery 38 of the brake tire 24 and the ground surface 16 causes the tire 24 to engage the ground and produces rotation of the tire 24 on the brake hub 10. Fractional forces are generated between an inner periphery 32 of the rotating brake tire 24 and the circumferential periphery 12 of the brake hub 10. The kinetic energy of the user's motion is dissipated substantially exclusively by friction between the tire 24 and hub 10. The extent of friction between the tire and hub is a function of their materials and the ratio of the circle of friction radii at the hub/tire interface and at the tire/ground interface, which do not vary. The friction is also a function of the radial pressure exerted by the user.

Provided the tire remains engaged with the ground surface, the friction generated by the brake mechanism is independent of the character of the ground surface. A person using the roller skate or other vehicle thus can slow or stoop using a dependably repeatable amount of pressure. Typically, engagement of the brake tire with the ground surface is controlled by lifting the toe of the leading skate, thus lowering the brake tire until it contacts and engages with the ground surface. The frictional force between the brake tire and the brake hub is then varied by modulating the loading force pinching the brake tire between the hub and the ground surface to control the frictional force between the brake tire and the brake hub. Similarly, a toe mounted version can be deployed by lifting the heel of the trailing foot to engage the brake mechanism.

Referring again to FIGS. 2, 3 and 5, the brake hub 10 preferably comprises a pair of frustum-shaped elements 34, 35 which are mounted in abutting relationship and disposed in opposite directions. Each of the frustum-shaped elements has a hole 22 which is alignable with that of the opposed frustum-shaped element and with a hole in the chassis 16. The holes 22 define a mounting hole 58 in the brake hub 10 for receiving a fastener such as bolt 52 secured by nut 54 for connecting the brake hub 10 to the chassis 16.

Figure 4:
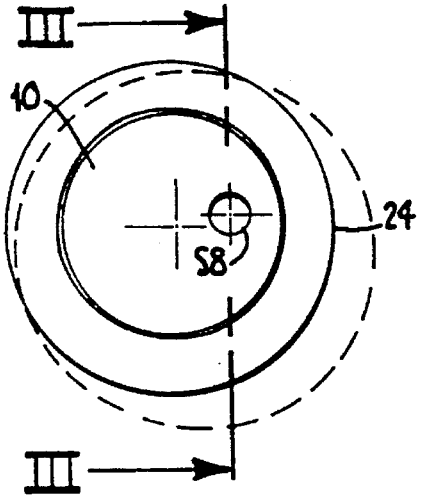
FIG. 4 is a side elevation view of a roller brake having an eccentric mounting hole according to the invention for adjusting a height of the roller brake above a skating surface.

The mounting hole 58 may be centrally located in the hub 10 as shown in FIG. 5, which arrangement has the advantage of eliminating a force acting on a moment arm which would tend to pivot the brake hub 10 around the bolt 52 when braking pressure is applied. Alternatively as shown in FIGS. 1, 2 and 4, the hole 58 can be disposed eccentrically relative to the axis of symmetry of the brake hub 10 and tire 24. This embodiment provides a means for adjusting the height of the brake tire above the ground surface of compensate for wear of the brake tire caused by contact with the ground surface. With this design, the roller brake can be pivoted around the point of attachment such as by loosening the bolt 54 on the nut 52, swiveling the roller brake to a new position such as shown in dashed lines in FIG. 4, and retightening the nut and bolt. For a more positive mounting, one or more additional holes can be provided, spaced from the eccentric hole at which the hub is mounted, for receiving a fastener to lock the hub and tire at the required position (i.e., height).

The eccentric hole 58 provides a means for adjusting a height of the outer periphery 38 of the brake tire above the ground surface. Other means for adjusting a height of the outer periphery of the brake tire above the ground surface may include other means of pivotally attaching the brake hub to the chassis, and means for fixing the brake hub at a selectable pivot position. The brake hub can also be controllably movable into engagement with the ground, for example by mounting the hub on a crank arm attached pivotally to the chassis at a transverse axis, or providing a mechanism to rotate the hub around an eccentric mounting shaft. An additional mounting hole and bolt (not shown) can be provided in a fixed or movable eccentric mounting, the additional mounting hole preferably defining a slot concentric with eccentric hole 58. In a fixed hub arrangement the additional mounting hole or slot receives a bolt for frictionally locking the hub at the desired position. Other means for clamping the hub in position at a desired height are also possible and should be readily apparent.

Referring again to FIG. 3, the circumferential periphery 12 of the brake hub 10 preferably defines a V-shaped surface, and the brake tire 24 preferably has a complementary shaped inner periphery 32. The V-shaped circumferential periphery 12 may be formed by the angled surfaces of the opposed frustum-shaped elements 34, 35, which arrangement allows easy assembly of the roller brake as well as easy replacement of the brake tire. The V-shaped circumferential surface has the advantage of providing self-centering of the brake tire 24 on the brake hub 10. According to the embodiment shown in FIG. 1, the chassis 16 includes a frame defined by a pair of vertical flanges 42, which can be the sides of a downwardly opening channel. The frame has at least one pair of aligned holes for receiving the bolt 52. The brake hub 10 is connected between the flanges 42 as shown in FIG. 2.

Figure 6:
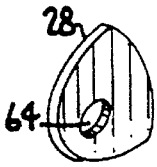
FIG. 6 is a perspective view of a side shield for the roller brake, for preventing access of dirt between the tire and hub.
Figure 7:
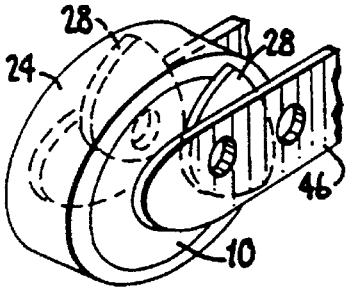
FIG. 7 is a perspective view of the roller brake as mounted on the frame, and showing the side shields in operative position.
Figure 8:
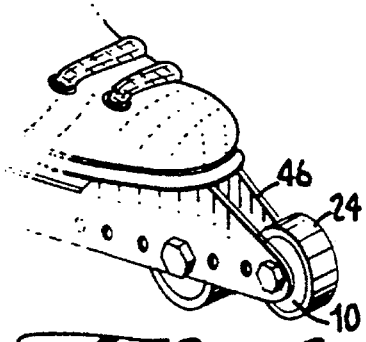
FIG. 8 is a perspective view of the roller brake according to the invention attached at the front or toe end of a roller skate.
Figure 9:
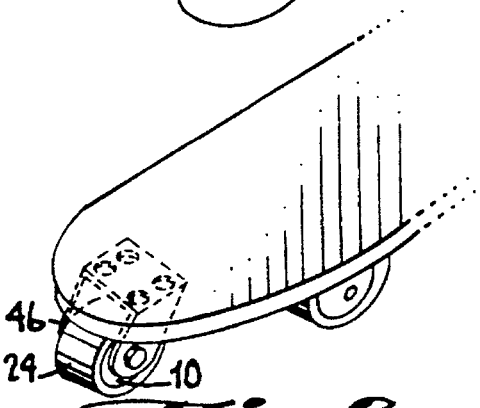
FIG. 9 is a perspective view of the roller brake as applied to a skate board according to the invention.

Referring now to FIGS. 6 and 7, The roller brake may comprise shield means disposed between the brake tire and the chassis 16 for protecting the chassis against impingement of debris. The shield means includes a pair of protector elements 28 mounted on opposite sides of the brake tire 24. Each of the protector elements 28 includes a hole 64 alignable with the hole in the chassis 16 and the hole 58 in the brake hub for receiving the bolt 52. The shield can extend partway around the circumference of the roller brake as shown, for example about 40°, or fully around the roller brake but not fully to the outer periphery of the tire. Preferably the shield resides substantially in the area of the frame.

The relative dimensions of the hub and the tire, and the angle of the V-shape defined by the facing frustum-shaped elements, have a substantial effect on the braking action of the roller brake. The width of the hub and the tire are such as to fit between the frame flanges, with clearance between the tire and the flanges to permit rotation without substantial friction between the tire and the frame flanges. Preferably, the tire is about the same width as the wheels of the skate, and occupies nearly the entire width between the frame flanges, about an inch (2.5 cm) in width.

The roller brake is preferably mounted at an endmost one of a plurality of holes along the frame flanges, the holes being along a line parallel to the ground surface, and provided to allow the user to remount the ground engaging wheels at different relative spacings. Inasmuch as the roller brake is thus mounted by a fastener at the same level as the axles of the wheels, the diameter of the roller brake is less than that of the wheels, whereby the roller brake is spaced above the ground surface. The wheels have a standard outer diameter of 2.75 inches (7 cm), and an appropriate outer diameter for the tire is about 2.0 inches (5 cm).

The angle of the frustum-shaped elements is such that radial pressure on the tire produces axially inward pressure on both sides of the tire. By making the angle steeper, a larger proportion of the radial force exerted by the user pinches the tire axially and increases the friction applied between the tire and the hub. By making the angle more shallow (nearer to horizontal), more of the pressure remains radial. It is possible to use a convex surface or a cylindrical surface together with means for retaining the tire on the hub against axial displacement. Preferably, however, the surface is either concave or V-shaped.

The frictional engagement between the tire and the ground must be greater than the frictional engagement between the tire and the hub, to assure that the tire rolls relative to the hub and remains fixed relative to the bearing surface, rather than vice-versa. This is satisfied provided the coefficients of friction, the respective radii of the hub and the periphery of the tire, and the angle of the hub/tire interface are selected with this end in mind. More particularly, for a hub wherein the conical frustum shapes define an angle $\theta$ relative to the rolling axis, if the tire has an outer radius $r_1$, the hub has an average outer radius $r_2$, and the respective coefficients of friction at the tire/ground interface are $f_1$ and $f_2$, the tire is assured of sliding relative to the hub and grabbing the ground if:

$$r_1 f_1 > \frac{r_2 f_2}{\cos\theta}$$

In order to begin rolling the tire on the hub, the coefficient of starting friction between the hub and tire, and the coefficient of sliding friction between the tire and the bearing surface, are the pertinent values. This inequality can be satisfied for a wide range of surfaces and their respective coefficients of friction, by choice of $r_1$ and $r_2$. Radius $r_1$ is inherently larger than $r_2$. For a brake mechanism intended for pavement and other rough surfaces, $f_1$ is normally larger than $f_2$ as well. However, it is not necessary that $f_1$ be greater than $f_2$, because the ratio of $r_2/\cos\theta$ modifies the relationship of $f_1$ and $f_2$. The frustum angle $\theta$ increases the relevant pressure at the hub/tire interface as a function of angle $\theta$. Therefore the brake mechanism is operable on smooth surfaces such as wood floors as well.

It is desirable to use a sufficient angle to provide sufficient friction and to axially pinch the wheel only enough so that in the normal course of braking the user does not stop the tire from rotating on the hub. The tire should be stopped on the hub only with maximum pressure (e.g., in a panic stop). It has been discovered that a good angle for the frustum-shaped elements in order to achieve these objectives is between 15° and 30°, and preferably 20° to 22° relative to horizontal. Therefore, the obtuse angle defined by the facing frustum-shaped elements is between 120° and 150°, and preferably 136° to 140°.

Preferably, the angle defined by the inside diameter of the tire is the same as the angle defined by the outside diameter of the hub. The inside diameter of the tire 24, however, is slightly larger than the outside diameter of the frustum-shaped elements to allow clearance for the tire to turn on the hub. The difference in dimensions is small enough that the tire does not become laterally displaced in the V-groove of the hub, for example when braking during a turn, but large enough that the tire is relatively free to turn on the hub when no radial pressure is applied. An appropriate difference between the two diameters is 0.020 to 0.050 inch (0.5 to 1.3 mm), and preferably about 0.040 inch (1.0 mm).

The frictional engagement of the tire and hub dissipates energy in the form of heat. The tire is preferably made of a thermoset polyurethane, which material is durable and not substantially damaged by heat, as well as soft enough to engage well with the ground. The hub is preferably aluminum or stainless steel, but can be a hard plastic as well.

The roller brake is suitable for use on any device which travels over a hard surface, particularly roller-type devices such as roller skates, skate boards, scooters and the like, which are readily tilted by the user. The roller brake can be mounted at an end, preferably a rear end, of the roller device whereby the outer periphery of the brake tire is engageable with the ground surface by pivoting the roller device on the endmost one of its ground engaging wheels. Users of such devices often acquire great skill in pivoting the devices on a rear wheel. This simple movement would enable the user to apply the roller brake in order to slow or stop the device. Experienced users could easily gain mastery in applying the roller brake to not only stop the roller device but also to control its movements in performing all types of maneuvers.

The roller brake according to the invention has the advantage that the frictional surfaces are always the same and a user does not experience different braking characteristics when traveling over varying surfaces or surfaces covered by dirt, dust etc. The roller brake thus provides consistent braking performance over all types of ground surfaces regardless of surface texture or contamination of the surface. The frictional surfaces of the roller brake are protected from contamination by dirt which would adversely affect braking performance and would decrease the running life of the roller brake components.

A roller brake as described is a very simple and useful addition to a roller skate, skateboard or other similar vehicle, but is not limited to this application. Another useful application of the brake is as a movable brake mechanism for larger vehicles. A structure such as a pivot arm or crank can be arranged to selectively apply the roller brake to a bearing surface, instead of tilting the chassis of the vehicle. For example, manually guided load carrying devices having a lever for steering and/or controlling a load carried on a platform can have a roller brake as described mounted on the controlling lever such that the brake is pressed to the ground by lowering the lever. Vehicles of this type are used in stores, warehouses and manufacturing environments, for example to move loads on the order of 100 to 1,000 pounds. The roller brake can be conveniently mounted under the steering lever, close to the load carrying surface. Downward pressure on the end of the steering lever presses the roller brake against the bearing surface at a multiple of the weight of the operator due to the mechanical advantage provided by the lever.

The roller brake is also applicable to the emergency braking of large vehicles such as trucks. A large scale brake hub (e.g., 200 to 1,000 pounds) can be deployed and pressed against the bearing surface by mechanical, hydraulic or spring means for dissipating kinetic energy as heat when moving down steep grades. For this application, the hub can be hollow and water filled, and engaged with three or four tires, separated by flanges. It is possible to generate sufficient heat in this manner to boil water in a hub, and with an appropriate passageway to relieve pressure, such as a check valve or pressure relief valve, the excess kinetic energy could be carried away as steam.

A further and particularly useful application of the invention is to movable work supports, workbenches, floor jacks, garage creepers, work chairs and similar objects which are intended to be movable over a floor, then used in a fixed position where they support a weight. The roller brake of the invention can be used in lieu of casters to provide the primary rolling support for the device. By properly choosing the dimensions of the contact surfaces, radii and the like, in particular making the ratio of the inner radius to the outer radius relatively small, the device is easily rolled like a caster wheel when the vehicle is not loaded, and when loaded with a weight locks the vehicle in place. For example, an automobile floor jack can be supported on roller brakes as described, easily rolled under a car, then locked in place due to the weight of the automobile when jacked up, thus greatly increasing the friction at the tire/hub interface. The ratio of inner radius to outer radius can be, for example, on the order of 0.10 to 0.20. The hub could be cylindrical or relatively flat, such as with a flat V-shape having an angle of 5° to 10° relative to the turning axis.

The invention having been disclosed, a number of additional uses and variations will now be apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. A roller brake for a device travelling over a ground surface, the device having a chassis, the chassis including a substantially horizontal platform, the roller brake comprising:

a brake hub connected to the chassis, the brake hub defining a horizontal axis of symmetry oriented perpendicular to a direction of forward travel of the device, the brake hub being fixed against rotation and having a circumferential periphery; and, a brake tire rotatably mounted annularly on the brake hub such that facing surfaces of the brake tire and the brake hub are in frictional contact, an outer periphery of the brake tire being disposed above the ground surface, the outer periphery being selectively engageable with the ground surface, contact between the brake tire and the ground surface producing rotation of the brake tire on the brake hub due to frictional engagement of the brake tire and the ground surface at a relatively greater radius from the horizontal axis, and kinetic energy of motion being dissipated by frictional engagement between the facing surfaces of the rotating brake tire and the fixed brake hub at a lesser radius from the horizontal axis, whereby varying pressure of the roller brake against the ground surface varies friction forces between the brake tire and the brake hub as the brake tire continues to rotate on the brake hub.

2. A roller brake for a device travelling over a ground surface, the device having a chassis, the chassis including a substantially horizontal platform, the roller brake comprising:

a brake hub connected to the chassis, the brake hub defining a horizontal axis of symmetry oriented perpendicular to a direction of forward travel of the device, the brake hub being fixed against rotation and having a circumferential periphery; and a brake tire rotatably mounted annularly on the brake hub, and outer periphery of the brake tire being disposed above the ground surface, the outer periphery being selectively engageable with the ground surface, contact with the ground surface producing rotation of the brake tire on the brake hub such that kinetic energy of motion is dissipated by friction forces generated between the rotating brake tire and the fixed brake hub; and, wherein the circumferential periphery of the brake hub defines a dished circumferential channel surface and the brake tire has a complementary shaped inner periphery, such that radial pressure on the brake tire produces an axial pressure between the hub and the brake tire.

3. The roller brake according to claim 1, wherein the circumferential channel is one of cylindrical, concave, convex and V-shaped.

4. The roller brake according to claim 2, wherein the brake hub includes a pair of opposed frustum-shaped elements defining the dished circumferential channel surface between them.

5. The roller brake according to claim 4, wherein the frustum shaped elements are conical and the dished circumferential channel surface is V-shaped.

6. The roller brake according to claim 5, wherein the V-shaped surface defines an obtuse angle of 120° to 150°.

7. The roller brake according to claim 6, wherein the V-shaped surface defines an obtuse angle of 136° to 140°.

8. The roller brake according to claim 1, further comprising means for adjusting a height of the outer periphery of the brake tire above the ground surface.

9. The roller brake according to claim 8, wherein the means for adjusting comprises the brake hub being pivotally attached to the chassis, and means for fixing the brake hub at a selectable pivot position.

*10. A roller brake for a device travelling over a ground surface, the device having a chassis, the chassis including a substantially horizontal platform, the roller brake comprising:*

*a brake hub connected to the chassis, the brake hub defining a horizontal axis of symmetry oriented perpendicular to a direction of forward travel of the device, the brake hub being fixed against rotation and have a circumferential periphery;*

*a brake tire rotatably mounted annularly on the brake hub such that facing surfaces of the brake tire and the brake hub are in frictional contact, an outer periphery of the brake tire being disposed above the ground surface, the outer periphery being selectively engageable with the ground surface, contact between the brake tire and the ground surface producing rotation of the brake tire on the brake hub due to frictional engagement of the brake tire and the ground surface at a relatively greater radius from the horizontal axis, and kinetic energy of motion being dissipated by frictional engagement between the facing surfaces of the rotating brake tire and the fixed brake hub at a lesser radius from the horizontal axis, whereby varying pressure of the roller brake against the ground surface varies friction forces between the brake tire and the brake hub as the brake tire continues to rotate on the brake hub; and,* [The roller brake according to claim 8, wherein the] *a* means for adjusting *a height of the outer periphery of the brake tire above the ground surface which* comprises the brake hub having a hole disposed eccentrically and extending parallel to the axis of symmetry, and the brake hub is attached to the chassis by a fastener extending through the eccentric hole.

11. The roller brake according to claim 1, wherein the brake hub includes a hole extending coaxial with the axis of symmetry, and the brake hub is connected to the chassis by a fastener extending through the hole.

12. The roller brake according to claim 1, wherein the chassis includes a pair of vertical flanges, and the brake hub is connected between the flanges.

13. The roller brake according to claim 1, further comprising shield means disposed between the brake tire and the chassis for protecting the chassis against impingement of debris.

14. The roller brake according to claim 1, wherein the device is a roller skate having at least one ground engaging wheel.

15. The roller brake according to claim 12, wherein the device is a roller skate having a plurality of wheels mounted in-line between the flanges.

16. The roller brake according to claim 14, wherein the brake hub is connected at an end of the roller skate, and the outer periphery of the brake tire is engageable with the ground surface by pivoting the roller skate about an axis of an endmost ground engaging wheel.

17. The roller brake according to claim 1, wherein the device is one of a roller skate, a skate board, a scooter, a variably loaded vehicle and a motorized vehicle.

18. The roller brake according to claim 2, wherein the tire comprises thermoset polyurethane.

19. A roller vehicle, comprising:

a chassis including a substantially horizontal platform for supporting a rider;

a plurality of ground engaging wheels mounted to carry the chassis over a ground surface;

a brake hub connected to the chassis, the brake hub defining a horizontal axis of symmetry oriented perpendicular to a direction of forward travel of the device, the brake hub being fixed against rotation and having a circumferential periphery; and a brake tire rotatably mounted annularly on the brake hub such that facing surfaces of the brake tire and the brake hub are in frictional contact, an outer periphery of the brake tire being disposed above the ground surface, the outer periphery being selectively engageable with the ground surface, contact between the brake tire and the ground surface producing rotation of the brake tire on the brake hub due to frictional engagement of the brake tire and the ground surface at a relatively greater radius from the horizontal axis, and kinetic energy of motion being dissipated by frictional engagement between the facing surfaces of the rotating brake tire and the fixed brake hub at a lesser radius from the horizontal axis, whereby varying pressure of the roller brake against the ground surface varies friction forces between the brake tire and the brake hub as the brake tire continues to rotate on the brake hub.

20. The roller vehicle according to claim 19, wherein the circumferential periphery of the brake hub comprises a pair of frustum-shaped elements coupled to define a V-shaped surface and the brake tire has a complementary shaped inner periphery, such that radial pressure on the brake tire produces an axially inward pressure between the hub and the brake tire.

21. The roller vehicle according to claim 20, wherein the V-shaped surface defines an obtuse angle of 120° to 150° and wherein an inner diameter of the tire is 0.5 to 1.3 mm larger than an outer diameter of the hub.

* * * * *